United States Patent
Nitta

(10) Patent No.: US 8,157,170 B2
(45) Date of Patent: Apr. 17, 2012

(54) CARD IDENTIFICATION DEVICE, CARD IDENTIFICATION METHOD, PROGRAM, AND INFORMATION RECORDING MEDIUM

(75) Inventor: Haruki Nitta, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 433 days.

(21) Appl. No.: 12/445,178

(22) PCT Filed: Oct. 12, 2007

(86) PCT No.: PCT/JP2007/069963
§ 371 (c)(1),
(2), (4) Date: Apr. 10, 2009

(87) PCT Pub. No.: WO2008/047710
PCT Pub. Date: Apr. 24, 2008

(65) Prior Publication Data
US 2010/0032484 A1    Feb. 11, 2010

(30) Foreign Application Priority Data
Oct. 13, 2006    (JP) ................................. 2006-279614

(51) Int. Cl.
*G06K 7/00*    (2006.01)
(52) U.S. Cl. .................. 235/439; 235/489; 235/458
(58) Field of Classification Search .............. 235/439; 434/169, 318
See application file for complete search history.

(56) References Cited

U.S. PATENT DOCUMENTS

| | | |
|---|---|---|
| 4,989,483 A | 2/1991 | Lacrouts-Cazenave |
| 5,781,515 A * | 7/1998 | Ogata et al. ................ 434/318 |
| 5,813,861 A * | 9/1998 | Wood ......................... 434/169 |
| 2006/0031174 A1* | 2/2006 | Steinmetz .................. 705/67 |
| 2007/0184900 A1* | 8/2007 | Matsumoto et al. .......... 463/37 |

FOREIGN PATENT DOCUMENTS

| | | |
|---|---|---|
| JP | 07-084661 | 3/1995 |
| JP | 11-149454 | 6/1999 |
| JP | 2000-157744 | 6/2000 |
| JP | 2006-247166 | 9/2006 |

OTHER PUBLICATIONS

Supplementary European Search Report of Nov. 5, 2009 for European Patent Application No. EP 07829699, 4 pages.
Dengeki Nintendo DS, vol. 6, No. 14, Sep. 1, 2006, p. 124.
International Search Report PCT/JP2007/069963 dated Jan. 15, 2008.

* cited by examiner

*Primary Examiner* — Steven S Paik
*Assistant Examiner* — Sonji Johnson
(74) *Attorney, Agent, or Firm* — Howard & Howard Attorneys PLLC

(57) ABSTRACT

Aimed is easy locating of a card placed on a touch panel, when identifying card type by sliding a touch pen, etc. along card slits. When a reference slit determining unit (404) of a card identification device (401) determines that a locus input from a touch panel unit (402) matches a reference slit, a slit region display control unit (405) displays longest slit regions images in which value slits are to be included on an image display unit (403). When a value slit determining unit (406) determines that a locus input thereafter matches any value slit, an input-finished slit display control unit (409) displays the image of the identified value slit on the image display unit (403), overlaying it on the longest slit region. When all value slits are identified, a card identifying unit (407) identifies the card type based on types of the identified value slits, and outputs it.

9 Claims, 9 Drawing Sheets

CARD IDENTIFICATION DEVICE, CARD IDENTIFICATION METHOD, PROGRAM, AND INFORMATION RECORDING MEDIUM

TECHNICAL FIELD

The present invention relates to a card identification device and a card identification method that allow easy locating of a card placed on a touch panel when identifying the type of the card by sliding a pointer such as a touch pen or the like along a slit formed in the card, a computer-readable information recording medium that stores a program for realizing these on a computer, and the program.

BACKGROUND ART

Techniques for computer card games that mimic games using real cards such as playing cards, Japanese playing cards, etc. have conventionally been proposed. Such a computer card game technique is disclosed in the following literature.

Patent Literature 1: Unexamined Japanese Patent Application KOKAI Publication No. 2000-157744

[Patent Literature 1] discloses a technique that uses not a real card form of a given kind of cards but their form as information expressed by a computer, and makes the computer judge a victory or a defeat of a game, to allow even a game beginner to enjoy the game even if the rules of the game are complicated.

Meanwhile, techniques for identifying a card type by recognizing a barcode printed on the card or reading the information recorded on a magnetic tape attached to the card have been proposed.

However, barcode readers and magnetic card readers are generally expensive and, in many cases, cannot be assembled into portable game consoles. In the meantime, inexpensive hardware for portable game consoles, etc. that utilize a touch pen and a touch panel to allow an input by a pen has begun to appear.

DISCLOSURE OF INVENTION

Problem to be Solved by the Invention

Hence, there is a strong demand for a card identification technique for allowing a computer to identify the type of real cards with inexpensive hardware and without requiring the user to do many operations to allow an easy input.

A conceivable method for card identification is to place a card having a slit on a touch panel and feeling the slit by a pointer such as a touch pen or the like to identify the type of the card. However, since the card size does not necessarily coincide with the touch panel size, a technique for appropriate card locating is also demanded.

The present invention aims for solving the above problem, and an object of the present invention is to provide a card identification device and a card identification method that allow easy locating of a card placed on a touch panel when identifying the type of the card by sliding a pointer such as a touch pen or the like along a slit formed in the card, a computer-readable information recording medium that stores a program for realizing these on a computer, and the program.

Means for Solving the Problem

To achieve the above object, the following invention is disclosed in accordance with the principle of the present invention.

A card identification device according to a first aspect of the present invention is a card identification device that identifies a type of a card having a plurality of slits, and includes a touch panel unit, an image display unit, a reference slit determining unit, a slit region display control unit, a value slit identifying unit, and a card identifying unit, which can be configured as follows.

Here, one of the plurality of slits is a reference slit having a predetermined asymmetric shape. Each of the others of the plurality of slits is a value slit whose position and length are determined such that the slit is included in an unshared one of a plurality of longest slit regions whose relative position with respect to the reference slit is predetermined. The combination of the positions and lengths of the plurality of value slits is associated with the type of the card.

That is, the card to be identified by the present invention has a plurality of slits, and one of them is a reference slit and the rest of them are value slits. Each of the value slits is assigned to any of a plurality of longest slit regions that are defined relatively with respect to the reference slit. The positions and lengths of the value slits are different card by card.

The shape of the reference slit may be, for example, an L letter shape. The longest slit region is a line segment (a narrow rectangle) having a predetermined length. The shape of the value slit is typically a line segment (a narrow rectangle) that constitutes part of the longest slit region.

The touch panel unit receives an input of a locus produced by a pointer such as a touch pen, etc. that slides along any slit of the card while moving in contact with the touch panel.

Typically, a user places a card on the surface of the touch panel unit, fixes the card with one hand, an operates the touch pen with the other hand to slide the touch pen along a slit to push the touch panel, move the touch pen with it keeping in contact with the touch panel, and input a locus. The input locus of the touch pen can be expressed by a sequence of coordinate values of a start point, halfway points, and an end point. In stead of the touch pen, a nail of a finger, a hairpin, a toothpick, or the like may be used as the pointer. For easier understanding, a touch pen case will be explained below.

The image display unit displays an image by making the image show through the touch panel unit.

That is, the touch panel unit is transparent or semi-transparent, and attached on the image display surface of the image display unit, and an image displayed on the image display unit shows through the touch panel unit. Such an integrated configuration of the touch panel unit and the image display unit may be called touch screen.

The reference slit determining unit determines whether the locus received by the touch panel unit matches the shape of the reference slit or not.

A reference slit and value slits are provided in the card. According to the present invention, the user has to first feel the reference slit. Then, the present device determines the position and posture of the card overlaid on the touch screen, and performs subsequence processes based on the position and posture determined here.

In a case where the reference slit determining unit determines that the locus matches the shape of the reference slit, the slit region display control unit controls the image display unit to display the shapes of the longest slit regions at the predetermined relative positions with respect to the position of the received locus that matches the shape of the reference slit.

Once the position and posture of the reference slit are known, it is possible to determine the positions of the longest slit regions in which the value slits are to be included. Thus, images that correspond to the longest slit regions are displayed on the image display unit.

When these images coincide with the value slits of the card, the user can know that the card is fixed well and not out of place. When these images and the value slits of the card do not coincide, the user can know that the position and posture of the card have deviated in the middle of the inputting operation.

In a case where a locus received by the touch panel unit is included in any of the displayed plurality of longest slit regions, the value slit identifying unit identifies the position and length of the value slit that is included in that longest slit region, based on the position and length of the received locus.

That is, an input of a locus into the touch panel is processed if it is made into any longest slit region, and an input of a locus into any other region is not to be interpreted as an input resulting from feeling a value slit. In this case, such an input may simply be ignored or may be seen as a triggering event for starting any other operation.

When, for all of the displayed plurality of longest slit regions, the position and length of the value slit included therein are identified, the card identifying unit identifies the type of the card based on the combination of the identified positions and lengths of the value slits.

As described above, the shape of the reference slit is the same in any types of the cards, while the positions and shapes of the value slits are different if the card types are different. Therefore, once the positions and shapes of the respective value slits are all identified in any card, the type of this card can be obtained.

According to the present invention, when a card is to be placed on the touch panel to let the slits of the card be felt and the card be identified, the card can be positioned or postured more freely and the user can make an input into the slits from his/her desired position and with a desired posture.

The card identification device according to the present invention can also be configured as follows. That is, in any of such cards, any one value slit (hereinafter referred to as "main value slit") out of the plurality of value slits has a smaller length than that of the longest slit region whose position and length are determined to include the main value slit, and the other value slits (hereinafter referred to as "sub value slits") than the main value slit of the plurality of value slits have the same length as that of the longest slit regions whose position and length are determined to include the sub value slits.

For example, consider cards for playing dress-up with comic characters. The cards can be classified into five general types of (1) character cards, (2) headwear cards, (3) tops cards, (4) bottoms cards, and (5) shoes cards. According to the present invention, one longest slit region is assigned to each of these five types. Therefore, the number of value slits is five, among which one is a main value slit and four are sub value slits.

For example, the slit at what order is the main value slit is predetermined for each general type of cards, such that the main value slit of a character card is the first value slit, that of a headwear card is the second value slit, and so on.

The position and length of the main value slit are such that the main value slit may be smaller than the longest slit region, and the sub value slits are the same size as the longest slit region.

In a case where a plurality of cards that have their main value slits included in longest slit regions whose relative position determined with respect to the reference slit are different are overlaid together and placed on the surface of the touch panel unit and the touch panel unit receives inputs of loci produced by the pointer that slides along the reference slits and overlapping portions of the value slits of the plurality of cards while moving in contact with the surface, each time the value slit identifying unit identifies the position and length of any main value slit, the card identifying unit identifies the type of the card, of the plurality of cards, that has that main value slit, based on the identified position and length of that main value slit.

When a plurality of cards of different types are overlaid and a dress-up pattern is set up, feeling the first value slit will immediately discriminate the type of the character card based on the position and length of the first value slit, and feeling the second value slit will immediately discriminate the type of the headdress card based on the position and length of the second value slit, . . . . In such a way, just feeling a value slit discriminates the general card type that is associated with the longest slit region including that value slit.

According to the present invention, when a plurality of cards are overlaid and the overlapping portion of the overlaid value slits is felt, the type of one of the overlaid cards is immediately discriminated just by feeling the value slits existing at one coinciding position, if one of the overlaid value slits is constrained position-wise and length-wise. Hence, simple and smooth card identification becomes possible.

The card identification device according to the present invention may further include an erasing unit, which may be configured as follows. If the position and length of any value slit have been identified by the value slit identifying unit when the reference slit determining unit determines that the locus matches the shape of the reference slit, the erasing unit may erase the identified position and length of the value slit.

When it is noticed that the card has become out of place in the middle of the inputting operation or that the pen has been put off halfway before the slit is felt all its length, it may be desired that the inputting be retried. According to the present invention, when the reference slit is felt once more, an inputting retry starts. In this way, the position of the reference slit is determined once again, and based on the newly determined position, images that represent the shapes of the longest slit regions are re-drawn.

According to the present invention, the user can given an instruction to start re-inputting to the slits by feeling the reference slit with the touch pen again, and can easily retry the inputting with a simple operation.

The card identification device according to the present invention may further include an input-finished slit display control unit, which may be configured as follows. Each time the position and length of any value slit are identified, the input-finished slit display control unit may control the image display unit to display, by referring to the position of the locus that matches the shape of the reference slit, a shape whose position and length in the longest slit region are the identified position and length of that value slit.

That is, a shape whose position and length are the identified ones is displayed for a value slit that has already been felt by the user, so that it is notified that inputting from this value slit has been finished. For example, it is preferable that the longest slit region and the value slit are displayed in different manners, such that different colors are used for displaying the shape of the longest slit region and the shape whose position and length are those of the identified value slit, etc.

According to the present invention, the user can proceed with the inputting operation while checking whether the position and shape of a value slit felt earlier have been identified as he/she wanted, and can easily distinguish any value slit that has not yet been felt, all of which make the inputting operation easy.

In the card identification device according to the present invention, inputting to the plurality of longest slit regions that is to be made after matching with the shape of the reference slit ends in success may be made in a predetermined order, and the slit region display control unit may emphatically display the shape of the longest slit region that includes the value slit whose position and shape should be, by an input of a locus from which being received, identified next in the predetermined order.

For example, in a case where the inputting order is predetermined to be from the above-described general types (1) to (5), the user is notified of the inputting order such that after the reference slit is felt, the longest slit region for the value slit (1) is emphatically displayed, after the value slit (1) is felt, the longest slit region for the value slit (2) is emphatically displayed, and so on.

According to the present invention, the user can easily discriminate the order of feeling the slits, and can prevent mistakes such as forgetting to input.

The card identification device according to the present invention may further include a warning output unit. The warning output unit may output a warning message in a case where a locus that is received is not included in any of the displayed plurality of longest slit regions.

In the first place, the longest slit regions are not displayed unless the position of the reference slit can be determined, so a warning message to this effect is output. Then, when a card becomes out of place, a surface that does not coincide with a longest slit region is felt by the touch pen, so a warning message to this effect is output.

A warning message is output typically as a buzzer sound or an alarming sound. However, in a case where there is any other display screen than the touch screen, a warning message may be displayed on this display screen. A warning message may be given by blinkingly displaying the shape of the longest slit region or displaying it in a different color.

According to the present invention, the user can be notified in an understandable manner that the user's operation to feel the slit has become a fault.

A card identification method according to another aspect of the present invention identifies a type of a card having a plurality of slits, and includes a touch panel step, a reference slit determining step, a slit region display controlling step, a value slit identifying step, and a card identifying step, which are configured as follows.

Here, it is typical that the card identification method is performed by a card identification device that includes a touch panel unit, an image display unit that displays an image by making the image show through the touch panel unit, a reference slit determining unit, a slit region display control unit, a value slit identifying unit, and a card identifying unit. The following explanation will be given about this case.

One of the plurality of slits is a reference slit having a predetermined asymmetric shape. Each of the others of the plurality of slits is a value slit whose position and length are determined such that the slit is included in an unshared one of a plurality of longest slit regions whose relative position with respect to the reference slit is predetermined. The combination of the positions and lengths of the plurality of value slits is associated with the type of the card.

At the touch panel step, the touch panel unit receives an input of a locus that is produced by a pointer that slides along any slit of the card placed on a surface of the touch panel unit while the pointer moving in contact with the surface to feel the slit.

At the reference slit determining step, the reference slit determining unit determines whether the locus received at the touch panel step matches the shape of the reference slit or not.

At the slit region display controlling step, in a case where it is determined at the reference slit determining step that the locus matches the shape of the reference slit, the slit region display control unit controls the image display unit to display the shapes of the plurality of longest slit regions at the predetermined relative positions with respect to the position of the received locus that matches the shape of the reference slit.

At the value slit identifying step, in a case where a locus received at the touch panel step is included in any of the displayed plurality of longest slit regions, the value slit identifying unit identifies the position and length of the value slit that is included in that longest slit region, based on the position and length of the received locus.

At the card identifying step, when, for all of the displayed plurality of longest slit regions, the position and length of the value slit included therein are identified, the card identifying unit identifies the type of the card based on the combination of the identified positions and lengths of the value slits.

A program according to another aspect of the present invention controls a computer to function as the card identification device described above, and controls a computer to perform the card identification method described above.

The program according to the present invention may be recorded on a computer-readable information recording medium such as a compact disk, a flexible disk, a hard disk, a magneto-optical disk, a digital video disk, a magnetic tape, a semiconductor memory, etc.

The above program may be distributed or sold via a computer communication network independently from a computer on which the program is executed. The above information recording medium may be distributed or sold independently from a computer.

EFFECT OF THE INVENTION

According to the present invention, it is possible to provide a card identification device and a card identification method that allow easy locating of a card placed on a touch panel when identifying the card type of the card by sliding a pointer such as a touch pen or the like along a slit formed in the card, a computer-readable information recording medium that stores a program for realizing these on a computer, and the program.

Figure 1:
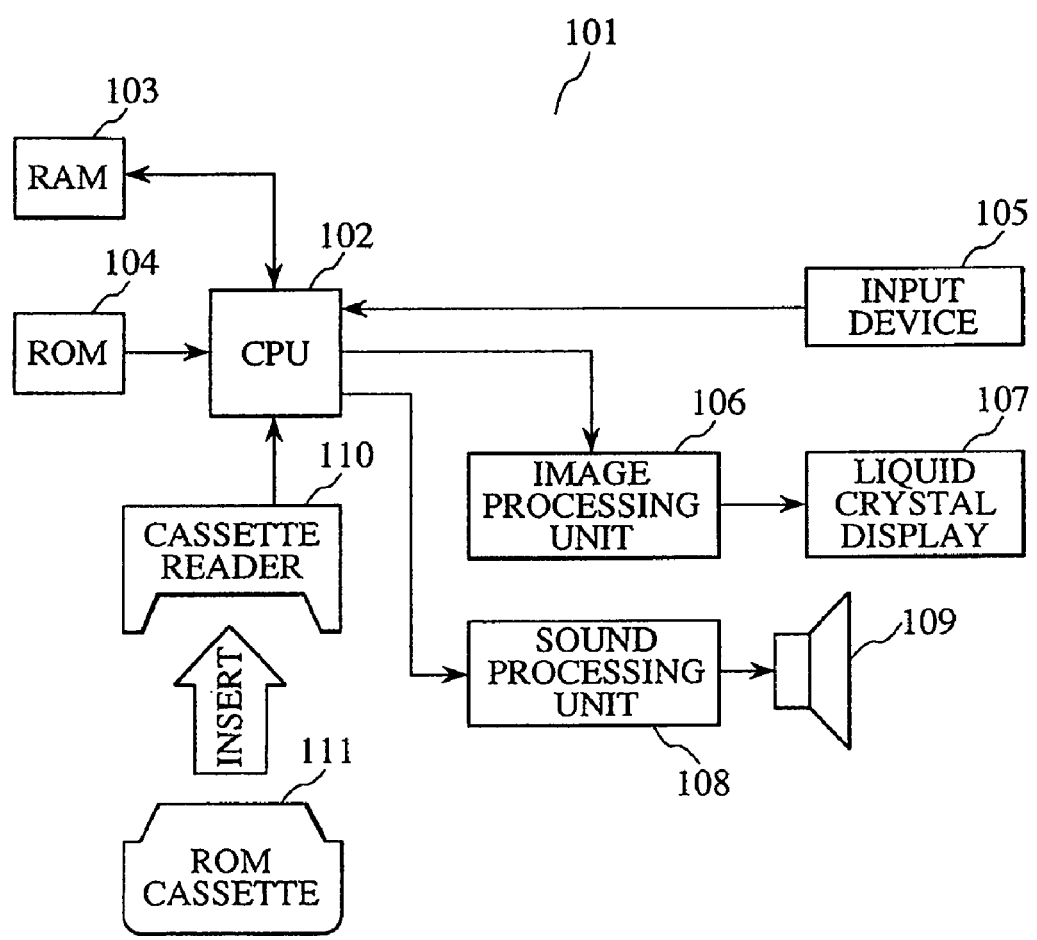
FIG. 1 is an exemplary diagram showing a schematic configuration of a typical information processing device that serves the functions of a card identification device according to the present invention by executing a program.

EXPLANATION OF REFERENCE NUMERALS 101 information processing device
102 CPU
103 RAM
104 ROM
105 input device
106 image processing unit
107 liquid crystal display
108 sound processing unit
109 speaker
110 cassette reader
111 ROM cassette
201 card
202 reference slit
203 value slit
204 longest slit region
401 card identification device
402 touch panel unit
403 image display unit
404 reference slit determining unit
405 slit region display control unit
406 value slit identifying unit
407 card identifying unit
408 erasing unit
409 input-finished slit display control unit
410 warning output unit
601 longest slit region image
602 center line
603 tolerance region
611 reference slit image
701 input-finished locus image
801 point
802 line segment
803 x-axis
804 y-axis

BEST MODE FOR CARRYING OUT THE INVENTION

Embodiments of the present invention will now be explained below. For easier understanding, embodiments in which the present invention is embodied with the use of an information processing device for games will be explained below, but the embodiments explained below are intended for illustration, not to limit the scope of the present invention. Hence, although those skilled in the art could employ embodiments obtained by replacing individual components or all the components of the embodiments below with equivalents of those, such embodiments will also be included in the scope of the present invention.

Embodiment 1

FIG. 1 is an exemplary diagram showing a schematic configuration of a typical information processing device that serves the functions of a card identification device according to the present invention by executing a program. The following explanation will be given with reference to FIG. 1.

The present information processing device 101 includes a Central Processing Unit (CPU) 102, a Random Access Memory (RAM) 103, a Read Only Memory (ROM) 104, an input device 105, an image processing unit 106, a liquid crystal display 107, a sound processing unit 108, a speaker 109, and a cassette reader 110.

The CPU 102 controls each unit of the present information processing device 101. The storage area of the RAM 103, the storage area of the ROM 104, and the storage area of a ROM cassette 111 inserted into the cassette reader 110 are all mapped to one memory space that is managed by the CPU 102, so the CPU 102 can acquire the information stored in each area by reading from the address to which each storage area is mapped. The storage area of the RAM 103 is also write-enabled.

In addition, the registers, which are the window to the image processing unit 106 or to the sound processing unit 108 when the CPU 102 issues any command to it, or the window to the input device 105 when the CPU 102 acquires some information therefrom, are also mapped to this memory space. Hence, the CPU 102 can issue a command by writing data representing the command into a predetermined address or can acquire information by reading data from a predetermined address.

When the information processing device 101 is turned on, the CPU 102 executes a program that starts from an address, to which the memory area of the ROM cassette 111 inserted into the cassette reader 110 is mapped. The RAM 103 is used for various purposes as a short memory area. A Basic Input/Output System (BIOS) routine provided by the information processing device 101 is recorded on the ROM 104, so that necessary programs can be called from the ROM cassette 111.

The input device 105 reflects an entry from any button for receiving an instruction entry designating a direction or an entry from any button for receiving an instruction entry distinctively indicating an operation of whatever kind, to the registers mapped to the memory space, and determines whether a touch panel attached to the surface of the top face of the liquid crystal display 107 is pushed or not and receives an entry of the coordinates of any point that is determined to be pushed.

The liquid crystal display 107 is managed by the image processing unit 106, which uses a memory area for storing tiles mapped to the memory space and a memory area for storing an object attribute memory. When the CPU 102 writes a value generated by computation into these memory areas or appropriately transfers information from the ROM cassette 111 inserted into the cassette reader 110 to these memory areas, sprite images are displayed on the liquid crystal display 107.

In addition, a frame buffer that manages, in the pixel unit, the images to be displayed on the liquid crystal display 107 can also be used. When a given color should be displayed at a given position on the liquid crystal display 107, writing a value corresponding to that color into the frame buffer at a position corresponding to that position will cause a bitmap image to be displayed on the liquid crystal display 107 at an appropriate timing.

For example, in a case where the liquid crystal display 107 is of a 320×200 dot size for 16-bit color display, the color of one pixel is expressed by 2 bytes. Here, an array of 320×200 elements (each element taking 2 bytes) is secured in the RAM 103 as a frame buffer, and the elements in the array are associated with the pixels on the liquid crystal display 107 one to one. A 16-bit value representing any color is written into each element of the array, and the image processing unit 106 controls the contents of the frame buffer to be reflected onto the liquid crystal display 107 at an appropriate timing (e.g., at a cycle of vertical synchronization interrupt).

It is general to prepare one or plural unit(s) of liquid crystal display 107. The present embodiment uses a plurality of liquid crystal displays, and one liquid crystal display 107 (the one upper in the diagram) is used for display purposes only, and another liquid crystal display 107 (the one lower in the diagram) is affixed with a touch panel.

An operation to push the touch panel with a touch pen causes the coordinate values of the corresponding position on the liquid crystal display 107 to be entered. That is, the touch panel and the liquid crystal display 107 together function as a touch screen.

Although the present information processing device 101 is used for a typical portable game device, the technique of the present invention can also be applied to any application that runs on a general-purpose computer, to or from which data is input or output via a mouse and keyboard and a Cathode Ray Tube (CRT). Such an embodiment is also included in the scope of the present invention.

Figure 2A:
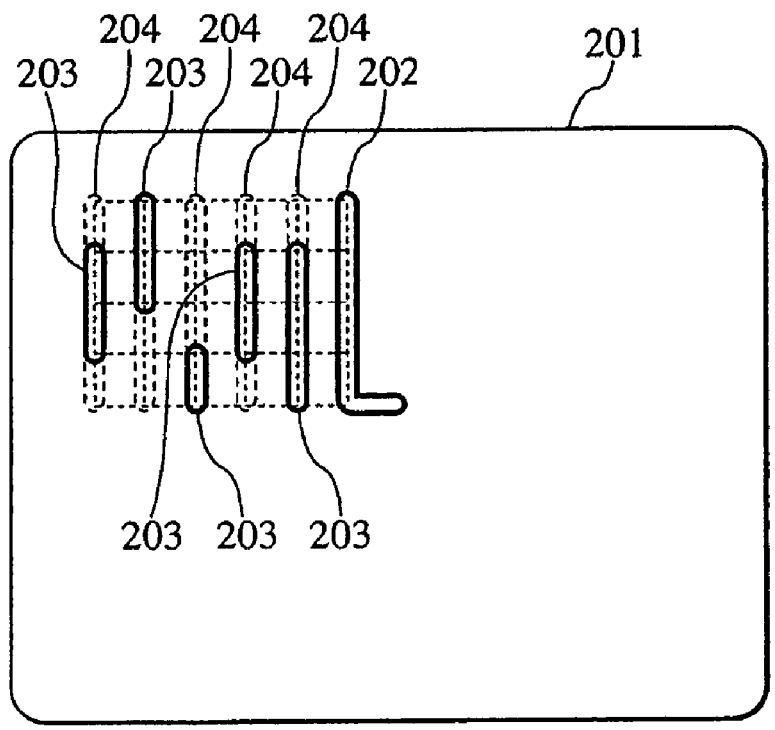
FIGS. 2 (*a*) and (*b*) are explanatory diagrams showing examples of the shapes of cards used with the card identification device according to the present invention.
Figure 2B:
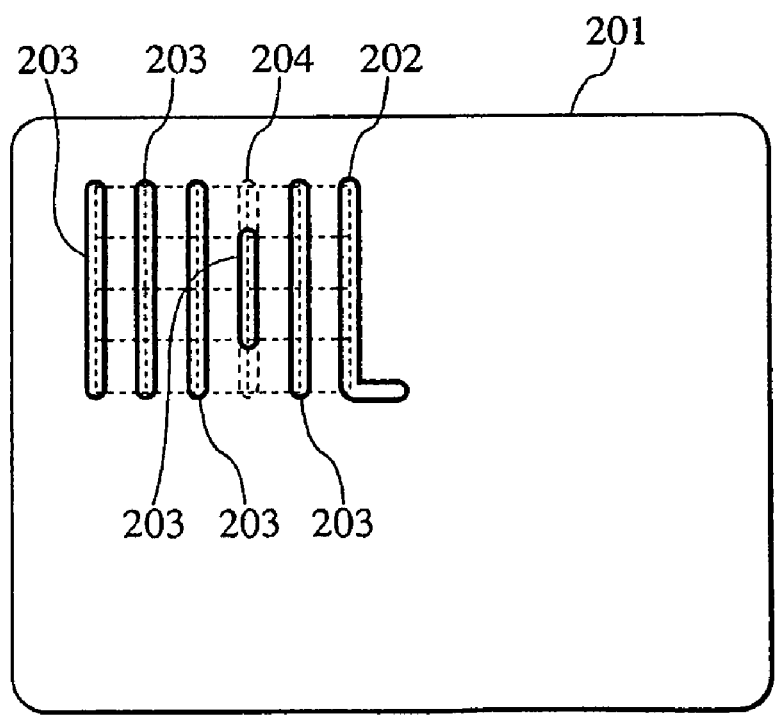

FIG. 2 are explanatory diagrams showing examples shapes of a card used for the card identification device according to the present invention. The following explanation will be given with reference to FIG. 2.

A card 201 has a reference slit 202 having an asymmetric shape and a five value slits 203. In the card of the present embodiment, the reference slit 202 has a shape of an L letter, and the value slits 203 are formed in parallel with the long side of the reference slit 202.

The long side and the short side of the reference slit 202 have different lengths. For example, assuming that the surface of the card displayed in FIG. 2 (*a*) is the "top" surface, going from the end of the long side of the reference slit 202 to the end of the short side thereof produces a locus that makes a "left turn". Going from the end of the short side of the reference slit 202 to the end of the long side thereof produces a locus that makes a "right turn". When the card is turned back, going from the end of the long side of the reference slit 202 to the end of the short side thereof produces a locus that makes a "right turn". Going from the end of the short side of the reference slit 202 to the end of the long side thereof produces a locus that makes a "left turn". Accordingly, checking the positional relationship between the long side and the short side of the locus of the reference slit 202 reveals whether the card 201 shows its top surface or its back surface.

Further, since the relative position and posture of the reference slit 202 with respect to the whole card 201 are fixed, the position and posture of the whole card 201 can be identified from the position and posture of the long side and short side of the reference slit 202.

The value slits 203 are arranged to be included in longest slit regions 204 (indicated by bold dot lines in FIG. 2 (*a*)) that have the same length as the long side of the reference slit 202 and that are arranged at equal intervals.

In the present example, the length of the longest slit region 204 is four times as long as a certain unit length (the length of a side of a grate unit indicated by fine dot lines in FIG. 2 (*a*)). The length of each value slit 203 is either the same length as or twice to four times the unit length.

In the present embodiment, the interval between the slits including the reference slit 202 and the respective value slits 203, and the length of the short side of the reference slit 202 are both the unit length.

In the example shown in FIG. 2 (*a*), observing the value slits 203 from those closer to the reference slit 202 to those farther from the reference slit 202, their lengths stated in the unit length are 3, 2, 1, 2, and 2 in this observing order, and their starting position seen from the upper edge of the card 201 stated in the unit length are 1, 1, 3, 0, and 1 in this observing order.

The shape of the reference slit 202, the length of the unit length, the number and lengths of the value slits 203, the length of the longest slit region 204, the interval between the slits, etc. can be appropriately changed according to uses.

As described above, it is case-by-case whether to use a single slit card or to use a plurality of slit cards and overlay them together to feel an overlapping portion of the overlaid slits. FIG. 2 show examples of both of these cases.

That is, FIG. 2 (*a*) shows an example where a single card 201 is used, where each value slit 203 can be either the same length as or twice to four times the unit length.

Meanwhile, FIG. 2 (*b*) shows an example where the maximum of five cards 201 (this number is equal to the number of value slits provided) are used overlaid, where only one of the five value slits 203 has a length that is the same as or twice to third times the unit length, and the remaining three value slits 203 are four times the unit length (equal to the length of the longest slit region 204). The former one value slit 203 will be referred to as main value slit, and the latter three value slits 203 will be referred to as sub value slit.

A general classification of the type of the card 201 can be identified based on what order value slit 203 the main value slit falls on as seen from the reference slit 202. Further, a specific type of the card 201 in that general classification can be identified based on the position and length of the main value slit.

For example, consider a case where the cards 201 are classified into the following five general types.

(1) a card of a character itself
(2) a card of its headwear
(3) a card of its tops
(4) a card of its bottoms
(5) a card of its shoes Since the general classification of the type of the card 201 can be identified based on the value slit 203 at what order the main value slit falls on as described above, the following correspondence relationships are defined in the present embodiment.

(1) In a case where the main value slit is the first value slit 203, the card is a character card.
(2) In a case where the main value slit is the second value slit 203, the card is a headwear card.
(3) In a case where the main value slit is the third value slit 203, the card is a tops card.
(4) In a case where the main value slit is the fourth value slit 203, the card is a bottoms card.
(5) In a case where the main value slit is the fifth value slit 203, the card is a shoes card.

For example, since the main value slit of the card 201 shown in FIG. 2 (*b*) is the second value slit 203, this card 201 is a headwear card.

The type of the headwear is indicated by the position of the main value slit, which is that value slit 203 (at what order the main value slit is as seen from the reference slit 202, and where in the longest slit region 204 the main value slit is arranged).

Figure 3:
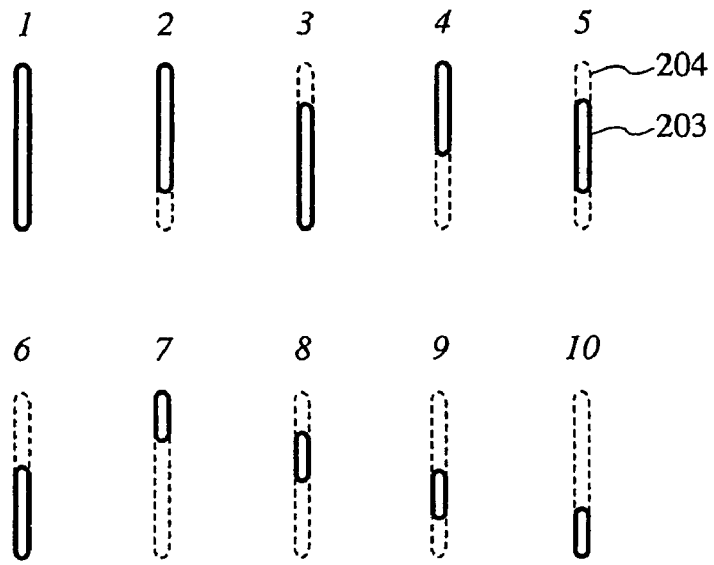
FIG. 3 is an explanatory diagram showing the relationship between longest slit regions and value slits included therein.

FIG. 3 is an explanatory diagram showing relationships between the longest slit region and the value slit included therein. The following explanation will be given with reference to FIG. 3.

In the diagram, for easier understanding, the longest slit region 204 is indicated by a dot line while the value slit 203 is indicated by a solid line, and a number (1 to 10) that is associated with the position of the value slit 203 in the longest slit region 204 and the length of the value slit 203 is indicated by an italic face.

In the present embodiment, the longest slit region 204 has four times as large a length as the unit length, and the value slit 203 has the same length as or twice to four times as large a length as the unit length. The value slit 203 is a single continuous slit in one longest slit region 204, and not split in the middle into a plurality of regions.

Hence, there are a total of ten types of value slits 203 as shown in FIG. 3, namely, (1) slit having four times as large a length as the unit length—1 type
(2) slit having three times as large a length as the unit length—2 types
(3) slit having twice as large a length as the unit length—3 types
(4) slit having the same length as the unit length—4 types.

Generally, in a case where the longest slit region 204 has an "m" times as large a length as the unit length, the number of types of values that can be expressed by a value slit 203 is $m(m+1)/2$.

In the example shown in FIG. 2 (a), since there are five value slits 203, the number of types that can be expressed by the card 201 is a total of $10^5=100000$ types. In a case where it is enough to have a less number of types that can be expressed by a card 201, some of the values obtained in this manner may be used as a checksum for checking whether an input via the value slits 203 is entered correctly.

In the example shown in FIG. 2 (b), since the value slits 203 having four times as large a length as the unit length are used as sub value slits, the main value slit 203 can represent nine types out of the values, which means that the number of types of headwear cards for playing dress-up is also nine. Accordingly, the total number of combinations for dress-up patterns that can be obtained by overlaying five cards is $9^5=59049$ types.

It is possible in some embodiment that each unit length included in the longest slit region 204 be associated with 1 bit to implement a value slit 203 that is split in the middle. Such an embodiment has shortcomings that an input that should be entered via a split slit tends to be forgotten, or that a portion between slits is vulnerable to breakage, but has an advantage that $2^m$ types of values ($2^m-1$ types of values, if the no slit opened pattern is excepted) can be expressed. Hence, such an embodiment may be an appropriate choice according to some uses.

Figure 4:
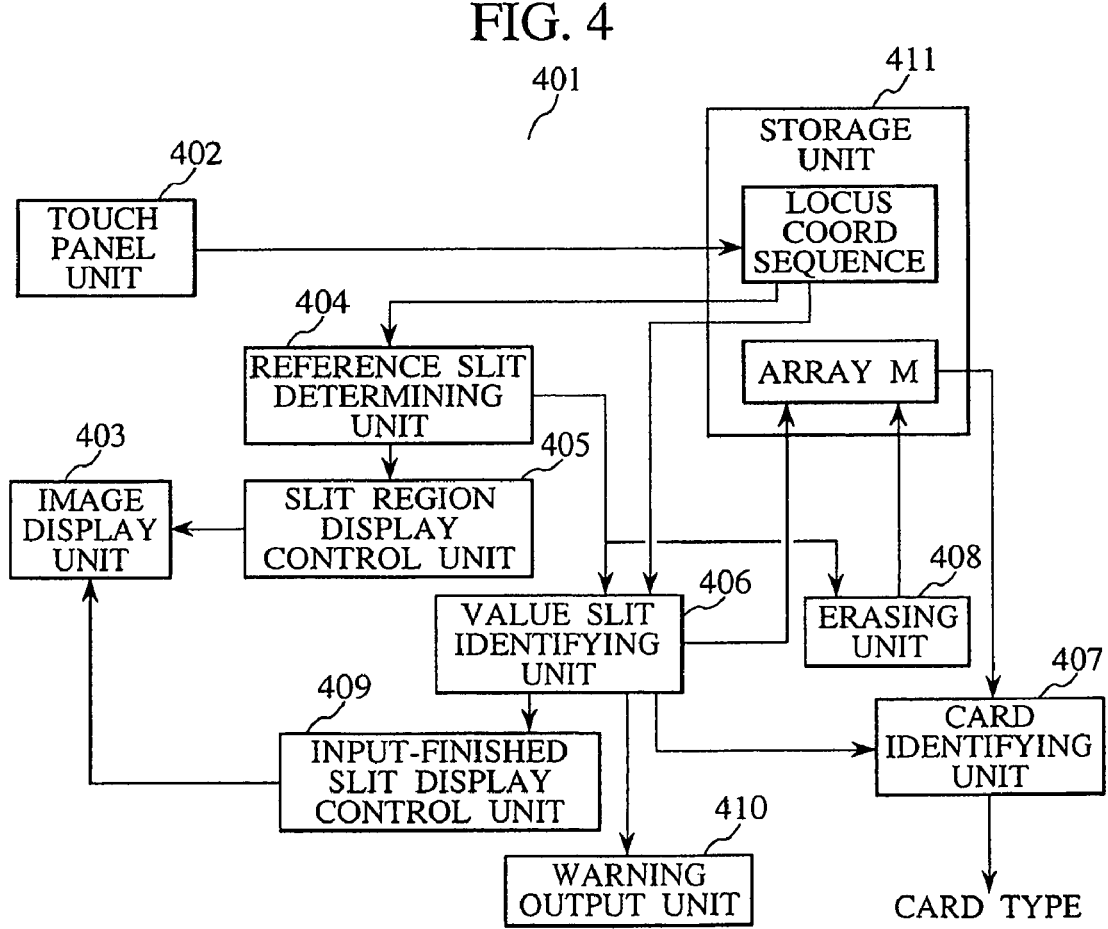
FIG. 4 is an explanatory diagram showing a schematic configuration of a card identification device according to the present embodiment.

FIG. 4 is an explanatory diagram showing a schematic configuration of a card identification device according to the present embodiment. The following explanation will be given below with reference to FIG. 4.

The card identification device 401 according to the present embodiment includes a touch panel unit 402, an image display unit 403, a reference slit determining unit 404, a slit region display control unit 405, a value slit identifying unit 406, a card identifying unit 407, an erasing unit 408, an input-finished slit display control unit 409, a warning output unit 410, and a storage unit 411, which are realized by the CPU 102 executing a program read from the ROM cassette 111 in the information processing device 101 described above.

Data of various kinds, such as a result of recognizing an entered sequence of coordinates, a halfway status, etc. are temporarily stored in the storage unit 411 constituted by the RAM 103 or the like, as such data would be in an ordinary computer process.

Figure 5:
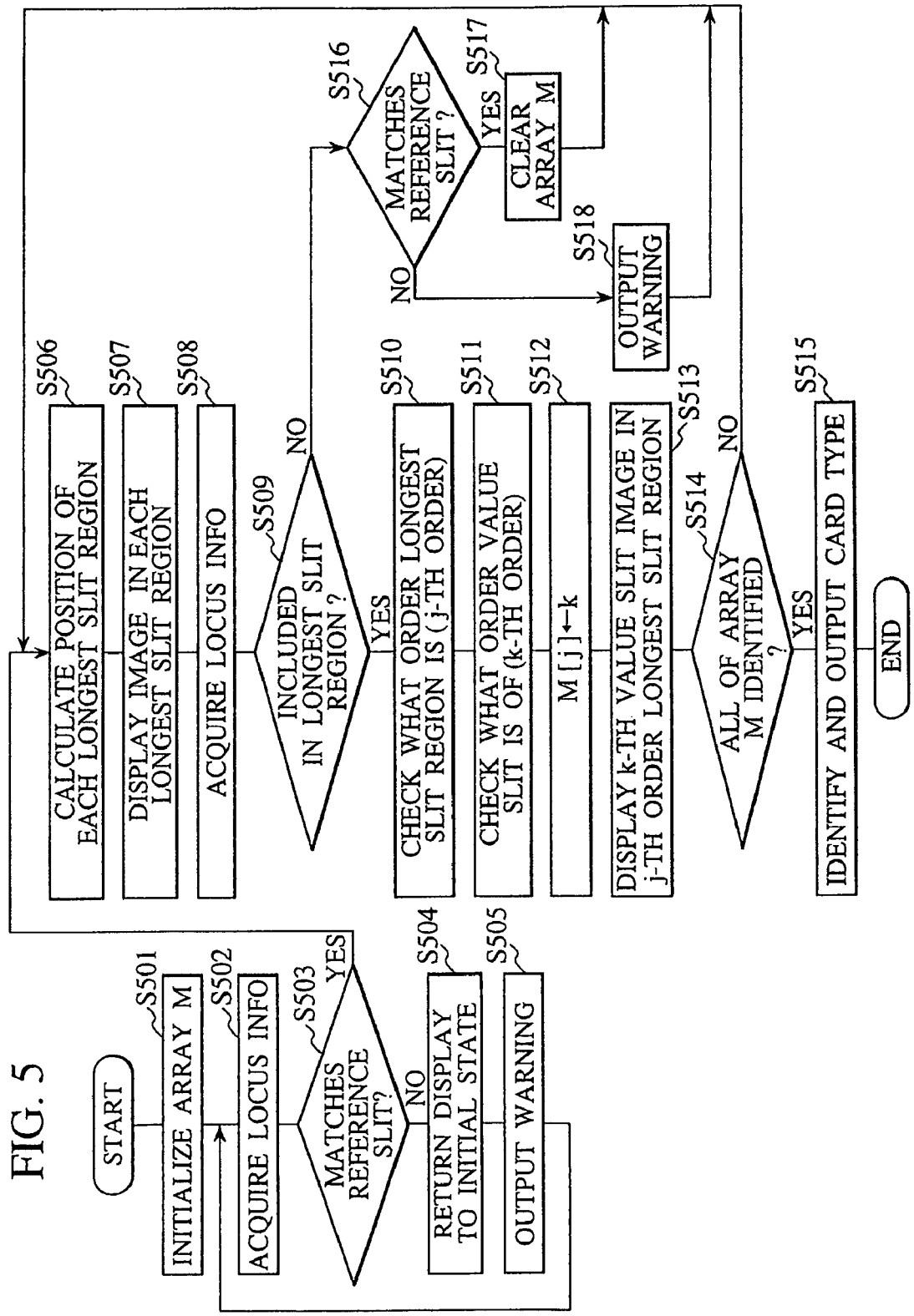
FIG. 5 is a flowchart showing the process flow of a card identification method performed by the card identification device.

FIG. 5 is a flowchart showing the process flow of a card identification method performed by the card identification device. The following explanation will be given with reference to FIG. 5.

First, the CPU 102 initializes an input value array M that is secured in the RAM 103 (step S501). In the present embodiment, the array M is an array of five elements (each element is any of M[0] to M[4]), because the number of value slits 203 is five.

In the present embodiment, a number of one of 1 to 10 is assigned to the position and length of each value slit 203 as shown in FIG. 3. Hence, each of these numbers is used as a value that indicates the position and length of any value slit 203 that is felt. In a case where no input is entered via any value slit 203, this value slit 203 is indicated by 0.

Accordingly, in the present step, M[i]←0 is performed while a counter variable "i" that is assigned to the RAM 103 or to a register provided in the CPU 102 is changed from 0 to 4. Here, "←" means to substitute or to assign.

Then, the CPU 102 monitors any pushing operation made to the touch panel of the input device 105 by accessing the registers mapped to the memory space, and acquires information about a locus that is produced by the touch pen by its movement keeping in contact with the touch panel that starts when the touch pen touches the touch panel and ends when it detaches therefrom (step S502).

Hence, the input device 105 that includes the touch panel functions as the touch panel unit 402. During the monitoring, the locus of the movement of the touch pen may be displayed and reflected on the liquid crystal display 107 in real time so the user can easily confirm.

Then, the CPU 102 determines whether a sequence of coordinates of the locus that is entered matches the shape of the reference slit 202 or not (step S503).

Hence, the CPU 102 operates in cooperation with the input device 105 and functions as the reference slit determining unit 404.

Various techniques for character recognition, figure recognition, and pattern recognition can be applied for this matching. The matching manner to be employed in the present embodiment will be described later.

In the present embodiment, the shape of the reference slit 202 is an L letter shape that has a short side having the same length as the unit length and a long side having four times as large a length as the unit length. Accordingly, by the matching process at step S503, it is possible to check how many dots on the touch panel of the input device 105 the unit length of the card 105 amounts to.

This information is useful when there are some kinds of information processing devices 101 and there are so many kinds of the Dots Per Inch (DPI) values of the liquid crystal display 107 and touch panel of the input device 105. With hardware that cannot have more than one kind of DPI value, it is possible to initially know the unit length of the card 201 as stated in the number of dots, so the known value may be used for matching determination.

In a case where the entered locus does not match (step S503; No), the CPU 102 returns the display to the initial state by performing such a process as erasing the locus if the locus is displayed on the screen (step S504), instructs the sound processing unit 108 to output a warning sound (step S505), and returns to step S502. Accordingly, the CPU 102 operates in cooperation with the sound processing unit 108, etc. and functions as the warning output unit 410.

The warning output unit 410 may employ a method of displaying a warning message on the upper liquid crystal display 107.

On the other hand, in a case where the entered locus matches (step S503; Yes), in which case the posture and position of the reference slit 202 in the coordinate system of the touch pane can be identified, the CPU 102 calculates the position of the longest slit regions 204 based on the identified information (step S506).

In the present example, all the longest slit regions 204 have four times as large a length as the unit length as explained with reference to FIG. 2 and FIG. 3. Further, as shown in FIG. 2, when shifting an eye from the end of the long side of the reference silt 202 to the verge of the reference slit 202 (i.e., viewing FIG. 2 from the top of FIG. 2 to the bottom of FIG. 2), the short side of the reference slit 202 extends to the left. The longest slit regions 204 are arranged on the side opposite to it (right hand side). The interval between the reference slit 202 and the nearest longest slit region 204, and the interval between the longest slit regions 204 are both equal to the unit length. That is, the longest slit regions 204 are arranged at equal intervals.

Hence, once the posture and position of the reference slit 202 are determined, the posture and position of each longest slit region 204 can be calculated. The calculation manner will be described later in detail as well as the matching manner.

Based on the calculated positions of the longest slit regions 204, the CPU 102 displays images on the liquid crystal display 107 at the positions corresponding to the longest slit regions 204 (step S507).

Hence, the CPU 102 operates in cooperation with the image processing process 106 and the liquid crystal display 107 and functions as the slit region display control unit 405.

Figure 6A:
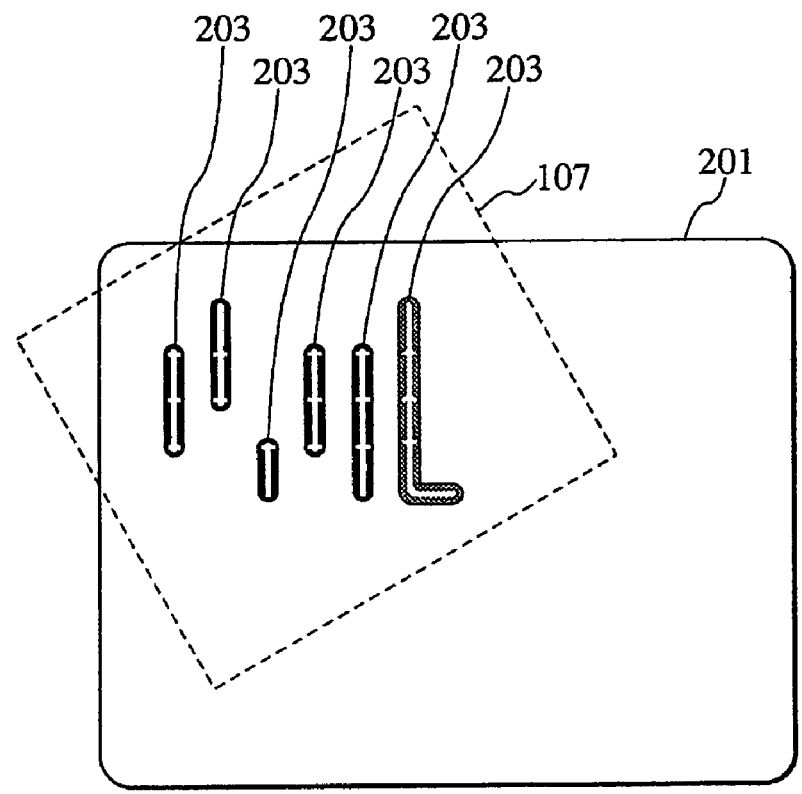
FIG. 6 (*a*) is an explanatory diagram showing the relationship between the position and posture of a reference slit and the position of a liquid crystal display, and Fig. (b) is an explanatory diagram showing how the longest slit regions displayed on the liquid crystal display after the position and posture of the reference slit are identified look.
Figure 6B:
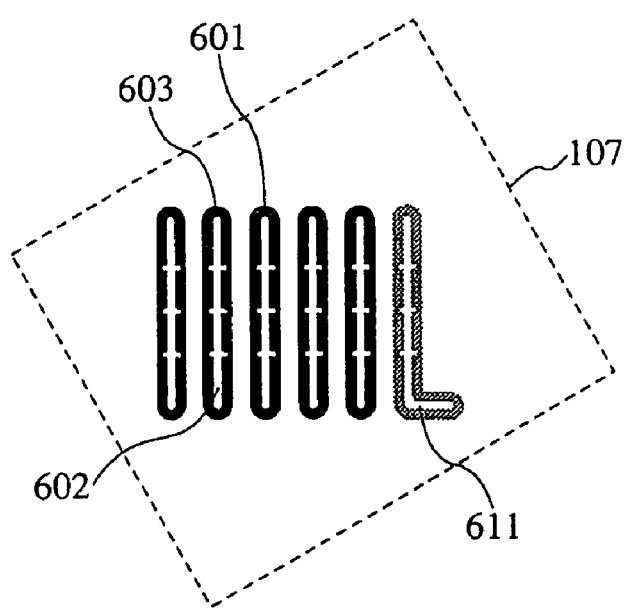

FIG. 6 are explanatory diagrams showing how the longest slit regions 204 are displayed on the liquid crystal display 107 after the position and posture of the reference slit 202 are identified. The following explanation will be given with reference to FIG. 6.

FIG. 6 (a) shows how the image displayed on the liquid crystal display 107 appears under a situation that the card 201 overlaps the touch panel of the liquid crystal display 107. FIG. 6 (b) shows how it appears when the card 201 is removed from the situation of FIG. 6 (a).

When the position and posture of the reference slit 202 are identified, images 601 that represent the longest slit regions 204 and an image 611 that represents the reference slit are displayed on the liquid crystal display 107 as shown in FIG. 6 (b).

The image 601 that represents the longest slit region 204 includes a center line 602 and a tolerance region 603 which are displayed in different colors (the former is displayed in a white color and the latter is displayed in a dark gray color in FIG. 6 (b)).

The length of the center line 602 is the same as the reference slit 202. The center line 602 is marked at each unit length to have a different width, and the user can recognize the unit length of the value slit 203 by seeing the marked position.

On the other hand, the image 611 that represents the reference slit is a figure rimmed to an L letter shape. In FIG. 6 (b), the rime is displayed in a pale gray color, and the center is displayed in a white color.

When the card 201 is overlaid on the touch panel of the liquid crystal display 107, a part of the image 601 that represents the longest slit region 204 shows through the value slit 203 as shown in FIG. 6 (a) (the legend "601" is not provided in FIG. 6 (a) so as not to make the diagram scrambled). In addition, a part of the image 611 that represents the reference slit also shows through the reference slit 202 (the legend "611" is not provided in FIG. 6 (a) so as not to make the diagram scrambled).

As shown in FIG. 6, giving the center line 602 a smaller width than that of the reference slit 202 makes both the center line 602 and the tolerance region 603 show through the reference slit 202.

Hence, if the center line 602 and the tolerance region 603 show through the value slit 203 and the center line 602 shows in the center of the reference slit 203, it is possible to say that the card 201 has not been out of place since the reference slit 202 of the card 201 is felt. Therefore, by checking the images 601 that show through the value slits 203, the user can proceed with entering operations while making sure that the card 201 is not out of place.

Then, the CPU 102 monitors any pushing operation to the touch panel of the input device 105 by accessing the registers mapped to the memory space, and acquires information about a locus produced by a movement of the touch pen on the touch panel from when the touch pen touches the touch panel until when it detaches therefrom (step S508). This process is the same as the process at step S501.

Then, the CPU 102 determines whether the acquired locus information is included in any of the longest slit regions 204 or not (step S509). This determination can also use a similar technique as the matching for the reference slit 202, and will be described later in detail.

In a case where the acquired locus information is included in any of the longest slit regions 204 (step S509; Yes), the CPU 102 checks at what order this longest slit region 204 is (step S510). Here, assume that it turns out to be at the j-th order.

The CPU 102 further checks which of the value slits 203 shown in FIG. 3 is represented by the position and length of the acquired locus information in the j-th longest slit region 204 (step S511). Here, assume that it turns out to be the value slit shown at the k-th order.

Then, the CPU 102 performs M[j]←k (step S512) to make the RAM 103 memorize that the value that indicates the position and length of the value slit 203 in the j-th longest slit region 204 is "k".

Hence, the CPU 102 operates in cooperation with the input device 105, etc. and functions as the value slit identifying unit 406.

Then, the CPU 102 controls the image processing unit 106 to display an image that represents the identified position and length on the liquid crystal display 107 based on the position and length of the k-th value slit 203 that is identified to be in the j-th longest slit region 204 (step S513).

Figure 7A:
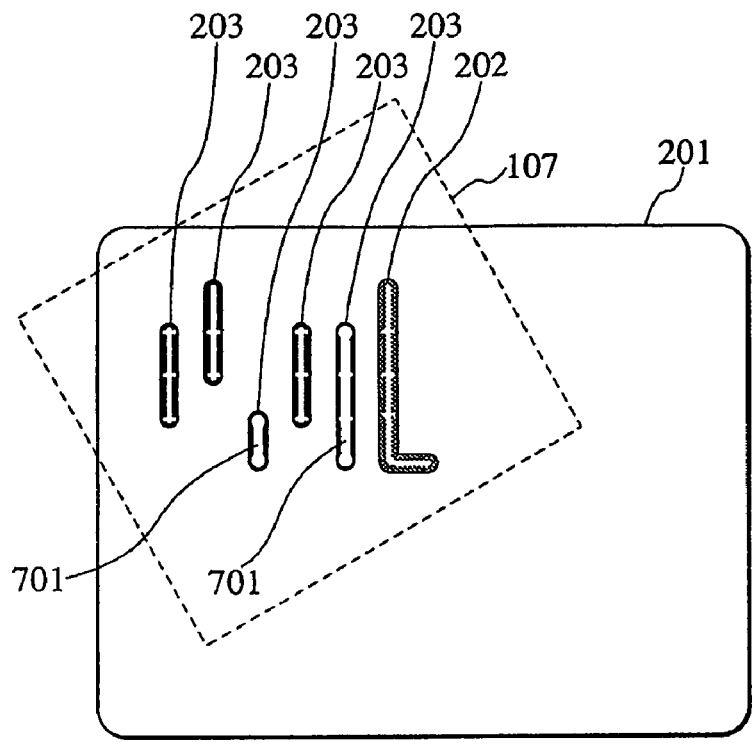
FIGS. 7 (a) and (b) are explanatory diagrams showing how an image representing the position and length of identified value slits is displayed.
Figure 7B:
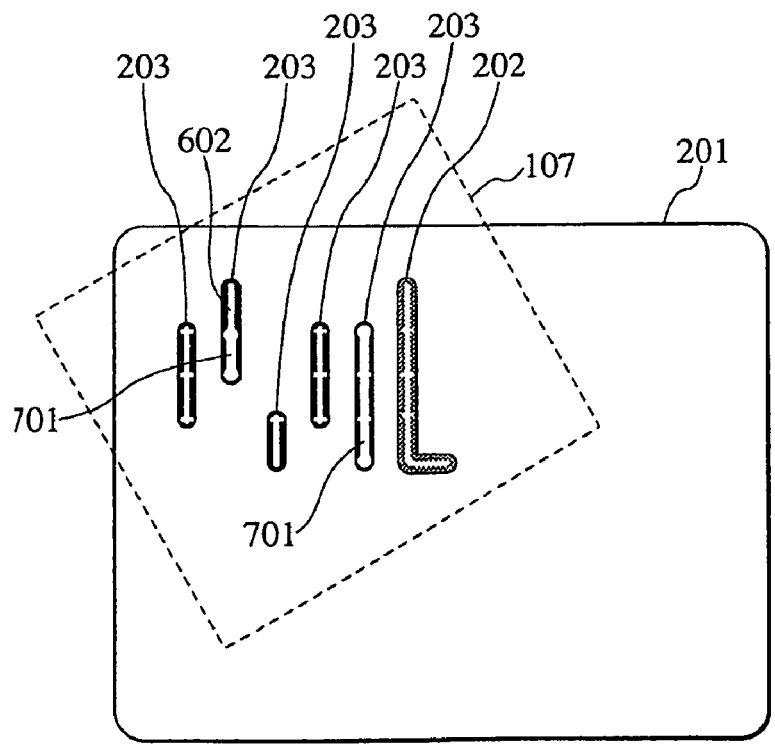
Figure 8:
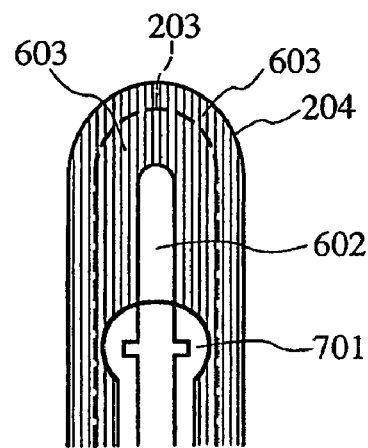
FIG. 8 is an explanatory diagram showing the positional relationship among a value slit, a longest slit region, a center line, a tolerance region, and an input-finished locus image.

FIG. 7 are explanatory diagrams showing how the image representing the position and length of the identified value slit 203 is displayed. FIG. 8 is an explanatory diagram showing the positional relationship among the longest slit region 204, the center line 602, the tolerance region 603, and an input-finished locus image 701. FIG. 8 is a partial expansion of FIG. 7. The following explanation will be given with reference to these diagrams.

In these diagrams, the center line 602 and tolerance region 603 of the images 601 that represent the longest slit regions 204 show through the value slits 203 of the card 201 likewise in FIG. 6 (*a*).

Here, the user has already finished feeling the first and third value slits 203. Hence, to make it noticeable that these slits have finished being felt, an input-finished locus image 701 that represents an iron-dumbbell-like shape formed by placing dots at the ends of the produced locus and joining the dots by a bold line is displayed.

Since the touch pen moves along the center line 602, the input-finished locus image 701 is displayed to be overlaid on the center line 602 of the image 601 that represents the longest slit region 204.

Further, since the input-finished locus image 701 is displayed based on the identified position and length, the length of the input-finished locus image 701 is an integer multiple of the unit length.

In the example shown in FIG. 7 (*b*), the input-finished locus image 701 has almost the same length as the first value slit 203, from which fact it can be confirmed that the first value slit 203 has been felt correctly.

The fourth value slit 203 is also finished being felt by the user, but the input-finished locus image 701 is displayed to be shorter than the fourth value slit 203. This is due to that the user has felt the slit not to the full and has detached the touch pen from the touch panel halfway.

In this way, the user can check whether the input operation to feel the value slit 203 has been correctly processed or not by seeing the display status of the input-finished locus image 701.

Furthermore, it is possible to easily check which value slit 203 has been felt and which value slit 203 has not yet been felt, based on whether an input-finished locus image 701 is displayed or not therefor.

Hence, the CPU 102 operates in cooperation with the image processing unit 106 and the liquid crystal display 107 and functions as the input-finished slit display control unit 409.

Then, the CPU 102 determines whether the position and length of the value slit 203 have been identified in all the five longest slit regions 204 or not (step S514). In the present embodiment, if M[i]#0 is established for all the values of "i"=0, 1, . . . , 4, the position and length identification has been finished in all of them.

Here, in a case where identification has not been finished in any of them (step S514; No), the CPU 102 returns to step S506.

On the other hand, in a case where identification has been finished in all of them (step S514; Yes), the CPU 102 identifies the type of the card 201 based on the values m[0], m[1], . . . , m[4] (step S515), and gets out of this flow. Hence, the CPU 102 functions as the card identifying unit 407.

The identification method used in a case exemplified by FIG. 2 (*a*), where a single card 201 is used, may be to regard a value, whose digits are the values obtained by subtracting 1 from m[0], m[1], . . . , m[4] respectively, as a five-digit decimal value that indicates the number that tells the type of the card 201.

In a case exemplified by FIG. 2 (*b*), where the maximum of five cards are overlaid, it is possible to identify each of
(1) the type of the character card based on m[0]
(2) the type of the headwear card based on m[1],
(3) the type of the tops card based on m[2],
(4) the type of the bottoms card based on m[3], and
(5) the type of the shoes card based on m[4].

In a case where M[i]=10, it means that the card of this i-th general classification has not been overlaid together.

In a case where the locus information acquired at step S508 is not included in any of the longest slit regions 204 (step S509; No), the CPU 102 determines whether the locus information matches the shape of the reference slit 202 or not (step S516). This matching determination may follow the same process as step S503.

In a case where the locus information matches the shape of the reference slit 202 (step S516; Yes), the CPU 102 clears the array M by performing M[i]←0 for each value of "i"=0, 1, . . . , 4 to erase the information about the position and length of the values slits 203 identified in the past (step S517), and returns to step S506. Hence, the CPU 102 operates in cooperation with the RAM 103 and functions as the erasing unit 408.

In this way, the user can easily retry the inputting via a value slit 203 by feeling the reference slit 202 once more.

On the other hand, in a case where the locus information does not match the shape of the reference slit 202 (step S516; No), the warning output unit 410 notifies the user that the inputting is invalid, by outputting a warning sound or displaying a warning message, etc. (step S518), and the flow returns to step S506.

As obvious from the above, according to the present embodiment, when making the reference slit 202 and the value slits 203 be felt with the touch pen by placing the card 201 over the touch panel of the input device 105, it is possible to easily check to how far the inputting to feel the value slit 203 has advanced and whether the inputting has been processed correctly. Further, it is possible to instruct a retry of the inputting, only by feeling the reference slit 202. Therefore, the user can easily let the card identification device 401 identify the type of the card 201 only by feeling the reference slit 202 and the value slits 203.

(Various Methods for Matching and Determination)

In the following description, it is assumed that information about a locus produced by a movement of the touch pen from when it touches the touch panel until when it detaches from the touch panel is obtained as a sequence of "n" pairs of coordinate values $(x_0, y_0), (x_1, y_1), (x_2, y_2), \ldots, (x_{n-1}, y_{n-1})$.

Generally, different persons have different ways of sliding a pen along a slit-shaped object to feel it. Some persons merely slide the pen from one end to the other end while others reciprocate the pen between the two ends a few times. Some persons put the pen at somewhere in the middle of the slit and others put the pen at the end of the slit to start sliding from there.

Therefore, the present card identification device 401 has to support various such inputting ways. The following description will detail various methods of matching and determination.

First, consider the simplest case where an input via a line-segment-shaped value slit 203 is recognized. Here, it is assumed that the position and shape of the longest slit region 204 relevant to the value slit 203 have already turned out.

If the relevant longest slit region 204 has been turned out, the coordinate value sequence $(x_0, y_0), (x_1, y_1), (x_2, y_2), \ldots, (x_{n-1}, y_{n-1})$ should necessarily be included in this longest slit region 204. Hence, if the sequence includes any coordinate point that is outside the longest slit region 204 within a predetermined allowable margin of error, such a coordinate point is removed from the coordinate value sequence and ignored.

In a case where the number or rate of coordinate points that are not included in the allowable margin of error exceeds a predetermined threshold, this may be processed as a matching failure. Further, as will be described later, since a relevant longest slit region 204 has not yet been discriminated when the recognition of the reference slit 202 is performed, such removing is not performed at this time.

The following explanation will assume that all the coordinate points are included in the longest slit region 204.

In this case, the coordinate value sequence
$(x_0, y_0), (x_1, y_1), (x_2, y_2), \ldots, (x_{n-1}, y_{n-1})$
should necessarily be arranged on a given line y=ax+b unless there is any inputting error. The so-called least square approach can be used to calculate the parameters "a" and "b" of the line.

That is, "a" and "b" are obtained by such calculations as below.

$$a = [\Sigma_{i=0}^{n-1} x_i y_i - n x_i y_i]/[\Sigma_{i=0}^{n-1} x_i^2 - n x_i^2];$$

$$b = E_i[y_i] - a E_i[x_i];$$

$$E_i[x_i] = \Sigma_{i=0}^{n-1} x_i/n;$$

$$E_i[y_i] = \Sigma_{i=0}^{n-1} y_i/n$$

Then, in order to find the end points of a line segment that constitutes a part of this line, the maximum value $x_{max}$ and the minimum value $x_{min}$ are extracted from
$x_0, \ldots, x_{n-1}$.
$x_{max} = \max_i[x_i];$
$x_{max} = \min_i[x_i]$
Hence, the coordinate values of the end points are
$(x_{min}, ax_{min}+b), (x_{max}, ax_{max}+b).$ The position and shape of the longest slit region 204 have already turned out. For example, consider a case where the coordinate values of end points of the longest slit region 204 are
$(P_{min}, Q_{min}), (P_{max}, Q_{max}).$ In the embodiment described above, the length of the longest slit regions 204 is four times as large as the unit length. Therefore, if the inputting is appropriate, the input coordinates
$(x_{min}, ax_{min}+b), (x_{max}, ax_{max}+b)$
of the end points must be each located near any of five points whose coordinates are obtained based on $$((kP_{min}+(4-k)P_{max})/4, (kQ_{min}+(4-k)Q_{max})/4),$$

which is calculated for each value of $k=0, \ldots, 4$.

Hence, the distance between these points is calculated and it is checked whether the distance is within a predetermined margin of error or not. If the distance is within the predetermined margin of error, this is seen as a matching success. The positions of the obtained match points are, among the positions of the five coordinate points obtained based on $$((kP_{min}+(4-k)P_{max})/4, (kQ_{min}+(4-k)Q_{max})/4),$$

two positions that match
$(x_{min}, ax_{min}+b), (x_{max}, ax_{max}+b)$
respectively. The length can be calculated from the positions of these two match points.

The least square approach is a simple and easy approach for finding a match with a line segment shape.

The least square method may be modified such that the error range of each coordinate point is calculated based on the calculated "a" and "b" parameters, so that if the error range of any coordinate point is larger than a predetermined allowable range, the coordinate values of the point may be ignored and new values may be recalculated, or if the number or rate of coordinate points whose calculated margin of error is larger than a predetermined allowable range exceeds a predetermined threshold, the matching may be determined as a failure.

In the above calculation, the reference is the x coordinates. However, the roles of the x coordinates and y coordinates may be interchanged. Typically, if the reference is switched such that the x-axis is the reference when the distribution of coordinate points is horizontally long and the y-axis is the reference when the distribution of coordinate points is vertically long, a phenomenon (division by zero) that the slop "a" becomes infinitely large does not occur.

As described above, the recognition of a line-segment-shaped value slit 203 is relatively easy. Meanwhile, in the recognition of the reference slit 202 in the embodiment described above, the shape of the reference slit 202 is an L letter shape.

Hence, a simple least square approach as described above may not be used, but the posture and position of the L-letter-shaped reference figure may be changed in a two-dimensional space to arrange the figure such that the square distance between the reference figure and each input point becomes the smallest. In this way, the matching determination can be made in a similar manner to the approach described above. Other than this, a relatively simple method as described below may also be used in the present embodiment.

First, a sequence of coordinate values
$(x_0, y_0), (x_1, y_1), (x_2, y_2), \ldots, (x_{n-1}, y_{n-1})$
should necessarily be arranged on either of the two line segments that form an L letter shape, unless there is any inputting error. Here, regarding adjacent three coordinate points
$(x_i, y_i), (x_{i+1}, y_{i+1}), (x_{i+2}, y_{i+2})$
that are included in the coordinate value sequence, it is determined whether the distance between
a line segment $(x_i, y_i)-(x_{i+2}, y_{i+2})$ and
the point $(x_{i+1}, y_{i+2})$
is smaller than an allowable error $\epsilon$. If the distance is smaller than the allowable error $\epsilon$, the middle coordinate point
$(x_{i+1}, y_{i+1})$
is deleted from the coordinate value sequence. This process is repeated until there is no coordinate point that can be deleted.

In this way, there should remain only the end points of the line segments that form the L letter shape, and pen touching points and pen detaching points.

Note that such coordinate deletion can be applied to the matching of value slits 203 described above. By performing deletion, it is possible to greatly reduce the number of points that have to be taken into consideration in the least square approach.

Assume that the sequence of remaining coordinate points is
$(X_0, Y_0), (X_1, Y_1), (X_2, Y_2), \ldots, (X_{m-1}, Y_{m-1})$ ($m \leq n$).
In this case, the line segments included in the sequence are
$(X_0, Y_0)-(X_1, Y_1),$
$(X_1, Y_1)-(X_2, Y_2),$
$(X_2, Y_2)-(X_3, Y_3), \ldots,$
$(X_{m-2}, Y_{m-2})-(X_{m-1}, Y_{m-1}).$ Then, the line segments are classified into two groups, based on whether the slope of these line segments is smaller than 1 or not smaller than 1 (generally, based on whether the angle formed between each line segment and the x-axis is $(\theta-45°)$ to $(\theta\pm45°)$ or not, where $\theta$ is a predetermined threshold angle).

Figure 9:
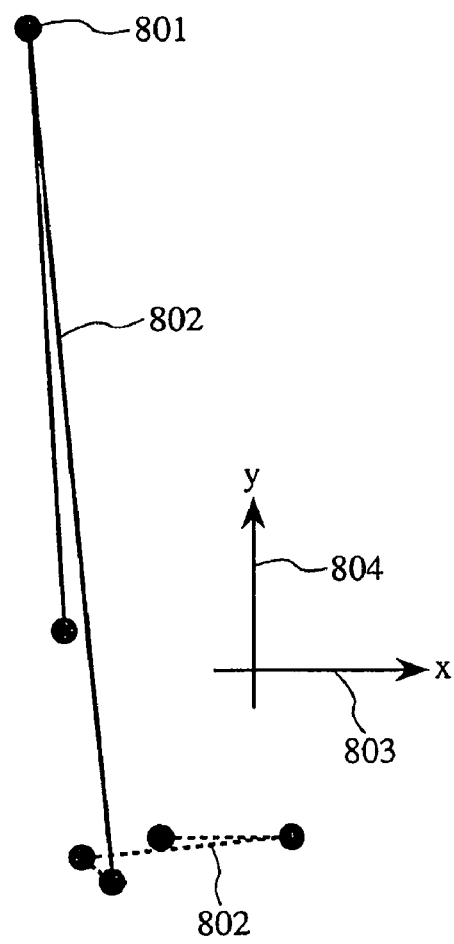
FIG. 9 shows a state of a sequence of remaining coordinate points being classified into two groups.

FIG. 9 is an explanatory diagram showing how the sequence of remaining coordinate points is classified into two groups.

As shown in FIG. 9, a line segment 802 that leads to a coordinate point 801 of the sequence is grouped based on whether its slope is within a predetermined range or not, i.e., which of the x-axis 803 and the y-axis 804 the slope makes the line segment closer to. In FIG. 9, a line segment 802 that is sloped closer to the x-axis 803 is drawn by a dot line, and a line segment 802 that is sloped closer to the y-axis 804 is drawn by a solid line.

As described above, since an L letter shape makes it short side and long side cross orthogonally, one of the two groups corresponds to the short side and the other corresponds to the long side. Hence, the end points are identified in each group by the least square approach likewise in the above-described case of value slits 203.

Since the number of coordinate points in the sequence has been greatly reduced up until now, the amount of calculations required in the least square approach will also be reduced.

Figure 10:
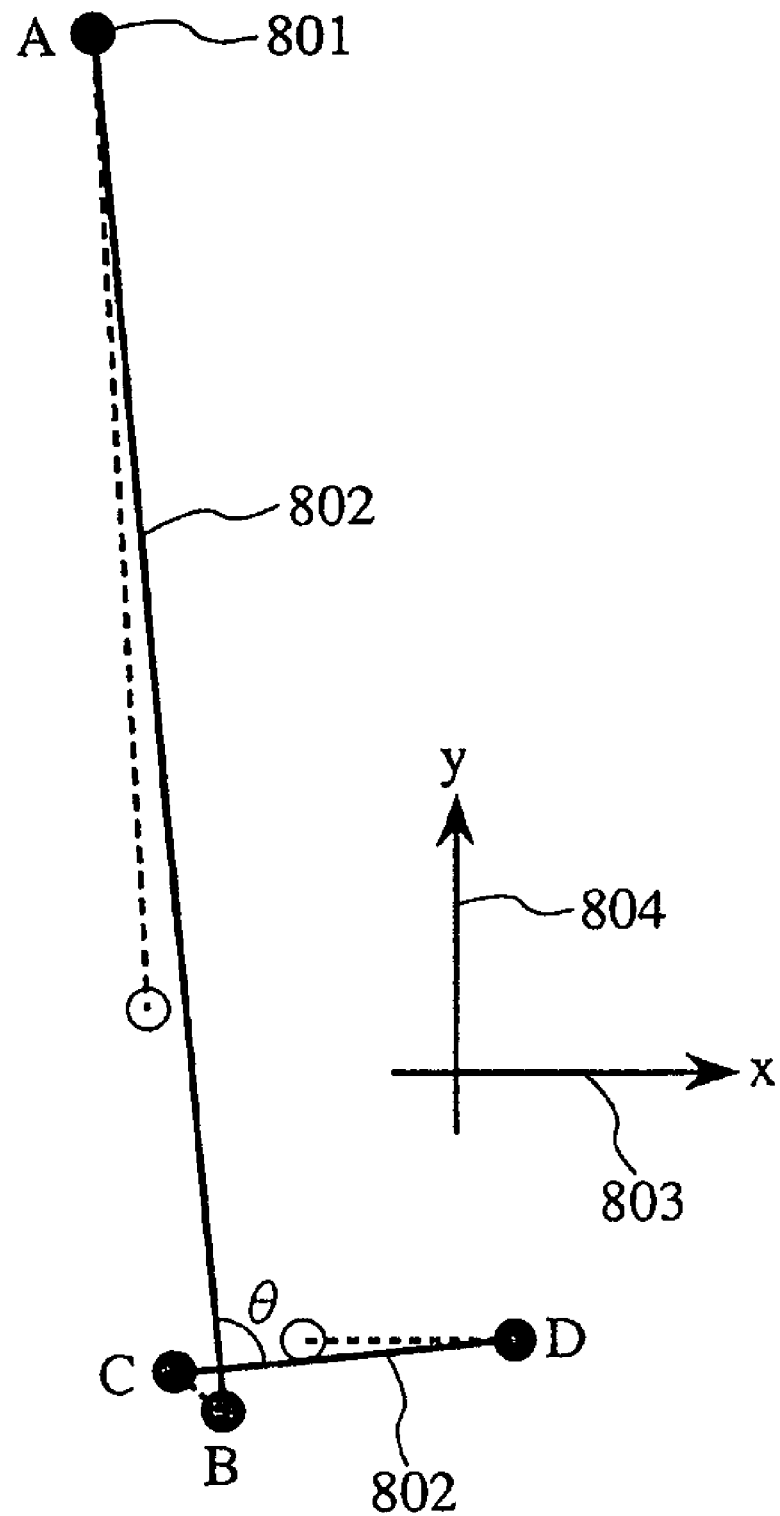
FIG. 10 is an explanatory diagram showing identified two pairs of end points each obtained from the two groups respectively.
Figure 11A:
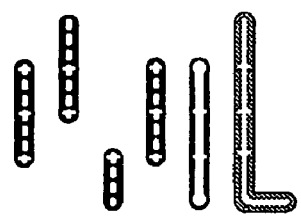
FIGS. 11 (a) to (f) are explanatory diagrams showing an example display method according to the present embodiment.
Figure 11B:
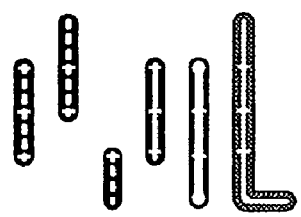
Figure 11C:
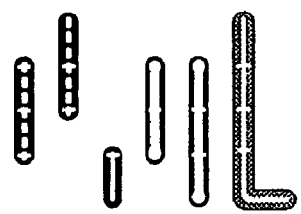
Figure 11D:
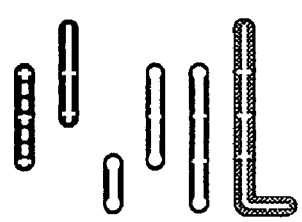
Figure 11E:
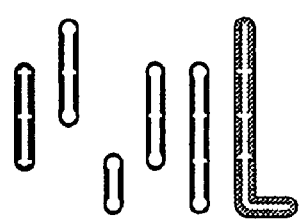
Figure 11F:
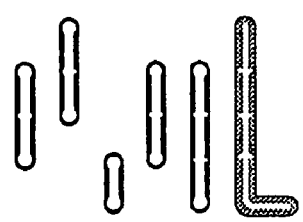

FIG. 10 is an explanatory diagram showing two pairs of end points identified from the two groups respectively. The following explanation will be given with reference to FIG. 10.

As shown in FIG. 10, two end points A and B are obtained from one group of line segments 802, and a pair of other two end points C and D are obtained from the other group of line segments 802.

In many cases, either A or B and either C or D coincide with each other. But in some possible cases, none of the four points A, B, C, and D coincide due to an error in the least square approach, an inputting error or inputting habit at the corner of the L letter shape, and the characteristics of the long side and short side of the L letter shape such as the slope. An example case where none of the four points A, B, C, and D coincide will be explained below more generally.

The line segment AB and the line segment CD should correspond to the short side and long side of the L letter shape. Hence, the ratio between the length of the line segment AB and the length of the line segment CD is calculated, and it is checked whether the calculated ratio is included within a predetermined allowable margin of error set for 1:4, which is the ratio between the short side and the long side of the L letter shape of the present embodiment. If the ratio is not included in the allowable margin of error, this is determined as a matching failure.

Next, it is checked whether the angle θ that is formed by the line AB and the line CD is included within a predetermined allowable margin of error set for a right angle. If the angle is not included within the allowable margin of error, this is determined as a matching failure.

Then, it is checked whether the smallest one of
the distance AC,
the distance AD,
the distance BC, and
the distance BD
is larger than a predetermined allowable margin of error or not. This is done because the combination of the points, the distance between which is the smallest, should be the points located near the corner of the L letter shape. In FIG. 10, the distance BC is the smallest distance In a case where either A or B and either C or D coincide with each other as described above, the smallest distance mentioned here is 0.

If the smallest distance is larger than the allowable margin of error, this is determined as a matching failure.

If these conditions are satisfied, either one of the points, the distance between which is the smallest, (or the median point of these points) is at the position of the point at the corner of the L letter shape, and the remaining two pints are at the positions of the end points of the long side and short side of the L letter shape. Further, it is possible to identify whether the card shows its top surface or its back surface, based on the positional relationship between the short side and the long side.

According to a first method of determination to be made thereafter, the matching is determined as a success in a case where the above conditions are all satisfied. Hence, the shorter one of the length of the line segment AB and the length of the line segment CD is the "unit length".

For example, in a case where the resolution (DPI value) of the touch panel of the input device 105 varies according to the type of the information processing device 101, different "unit lengths" will be calculated from a sequence of coordinate values even when the same reference slit 202 is felt. Hence, by the matching of the reference slit 202, it is possible to determine the "unit length" of the information processing device 101.

A second method can be used in a case where the resolution (DPI value) of the touch panel of the input device 105 is fixed in all information processing devices 101. In this case, the "unit length" is also fixed.

This method makes a determination about another matching condition whether the shorter one of the length of the line segment AB and the length of the line segment CD is within a predetermined allowable margin of error set for the "unit length", and determines the matching as a success if the shorter length is within the allowable margin of error while determines the matching as a failure if not.

In the ways described above, the L-letter-shaped reference slit 202 and the line-segment-shaped value slits 203 can be recognized when they are felt. Various other figure recognition means than the above methods may be employed.

Embodiment 2

In the embodiment described above, the position of the reference slit 202 is identified by feeling the reference slit 202, the positions of the respective longest slit regions 204 are identified based on the identified position of the reference slit 202, and a plurality of center lines 602 and tolerance regions 603 are displayed as images 601 that represent the identified longest slit regions 204.

However, in some case, the order of inputting via the value slits 203 to feel them is fixed. For example, a method of feeling the value slits 203 from those closer to the reference slit 202 uses a fixed order. Such a method is advantageous in that it can more securely prevent any slit from being forgotten to input from.

In the case where the order of inputting via the value slits 203 is fixed, it is desired that the order is shown to the user. Hence, in the present embodiment, a method for showing the order to the user will be provided.

FIG. 11 are explanatory diagrams showing an example display method according to the present embodiment. The following explanation will be given with reference to FIG. 11. In FIG. 11, for easier understanding, no signs are provided.

FIG. 11 (*a*) shows the display that appears immediately after the reference slit 202 is felt. FIGS. 11 (*b*) through (*f*) show in order the displays that appear when the value slits 203 are felt in a predetermined order after the reference slit 202 is felt.

As shown in FIG. 11, an image 601 that represents the longest slit region 204 that should be felt next displays the center line 602 emphatically, and an image 601 that represents any other longest slit region 204 than that that should be felt next displays the center line 602 normally.

In FIG. 11, the center line 602 is conspicuously drawn by a solid line in the emphatic display, while in the normal display, the center line 602 is conspicuously drawn by a dot line.

It is possible to employ various emphatic display methods, such as changing the brightness of the longest slit region 204, blinking the longest slit region 204, changing the color of the longest slit region 204, etc.

In the present embodiment, as the inputting proceeds, input-finished locus images 701 are produced in order from the side of the reference slit 202, which corresponds to the order of inputting.

According to the present embodiment, it is possible to direct the user to perform inputting in the correct order, by showing the user the value slit 203 that should be felt next by emphatically displaying it.

The present application claims priority based on Japanese Patent Application KOKAI Publication No. 2006-279614, the content of which is incorporated herein if the law of the designated state allows.

INDUSTRIAL APPLICABILITY

As described above, according to the present invention, it is possible to provide a card identification device and a card identification method that allow easy locating of a card placed on a touch panel when identifying the type of the card by sliding a pointer such as a touch pen or the like along a slit formed in the card, a computer-readable information recording medium that stores a program for realizing these on a computer, and the program.

The invention claimed is:

1. A card identification device that identifies a type of a card having a plurality of slits, one of the plurality of slits being a reference slit having a predetermined asymmetric shape, each of the others of the plurality of slits being a value slit whose position and length are determined such that the slit is included in an unshared one of a plurality of longest slit regions whose relative position with respect to the reference slit is predetermined, and a combination of the positions and lengths of the plurality of value slits being associated with the type of the card, the device comprising:
a touch panel unit, on whose surface the card is placed, that receives an input of a locus produced by a pointer that slides along any slit of the card placed on the surface while moving in contact with the surface to feel the slit;
an image display unit that displays an image by making the image show through the touch panel unit;
a reference slit determining unit that determines whether the locus received by the touch panel unit matches the shape of the reference slit or not;
a slit region display control unit that, in a case where the reference slit determining unit determines that the locus matches the shape of the reference slit, controls the image display unit to display shapes of the longest slit regions at the predetermined relative positions with respect to a position of the received locus that matches the shape of the reference slit;
a value slit identifying unit that, in a case where the locus received by the touch panel unit is included in any of the displayed plurality of longest slit regions, identifies the position and length of the value slit that is included in that longest slit region, based on a position and length of the received locus; and
a card identifying unit that, when, for all of the displayed plurality of longest slit regions, the position and length of the value slit included therein are identified, identifies the type of the card based on a combination of the identified positions and lengths of the value slits.

2. The card identification device according to claim 1, wherein in any of such cards, any one value slit, (hereinafter referred to as "main value slit", out of the plurality of value slits has a smaller length than that of the longest slit region whose position and length are determined to include the main value slit, and the other value slits, hereinafter referred to as "sub value slits", than the main value slit of the plurality of value slits have the same length as that of the longest slit regions whose position and length are determined to include the sub value slits,
in a case where a plurality of cards that have their main value slits included in longest slit regions whose relative positions determined with respect to the reference slit are different are overlaid together and placed on the surface of the touch panel unit and the touch panel unit receives inputs of loci produced by the pointer that slides along the reference slits and overlapping portions of the value slits of the plurality of cards while moving in contact with the surfaces, each time the value slit identifying unit identifies the position and length of any main value slit, the card identifying unit identifies the type of the card, of the plurality of cards, that has that main value slit, based on the identified position and length of that main value slit.

3. The card identification device according to claim 1, further comprising an erasing unit that, if the position and length of any value slit have been identified by the value slit identifying unit when the reference slit determining unit determines that the locus matches the shape of the reference slit, erases the identified position and length of the value slit.

4. The card identification device according to claim 1, further comprising an input-finished slit display control unit that, each time the position and length of any value slit are identified, controls the image display unit to display a shape whose position and length in the longest slit region are the identified position and length of that value slit, by referring to the position of the locus that matches the shape of the reference slit.

5. The card identification device according to claim 1, wherein inputting to the plurality of longest slit regions that is to be made after matching with the shape of the reference slit ends in success is made in a predetermined order, and
the slit region display control unit emphatically displays the shape of the longest slit region that includes the value slit whose position and shape should be, by an input of the locus from which being received, identified next in the predetermined order.

6. The card identification device according to claim 1, further comprising a warning output unit that outputs a warning message in a case where the locus that is received is not included in any of the displayed plurality of longest slit regions.

7. A card identification method for identifying a type of a card having a plurality of slits by using a touch panel unit and an image display unit that displays an image by making the image show through the touch panel unit, one of the plurality of slits being a reference slit having a predetermined asymmetric shape, each of the others of the plurality of slits being a value slit whose position and length are determined such that the slit is included in an unshared one of a plurality of longest slit regions whose relative position with respect to the reference slit is predetermined, and a combination of the positions and lengths of the plurality of value slits being associated with the type of the card, the card identification method comprising:

a touch panel step of receiving an input of a locus that is produced by a pointer that slides along any slit of the card placed on a surface of the touch panel unit while the pointer moving in contact with the surface to feel the slit;

a reference slit determining step of determining whether the locus received at the touch panel step matches the shape of the reference slit or not;

a slit region display controlling step of, in a case where it is determined at the reference slit determining step that the locus matches the shape of the reference slit, controlling the image display unit to display shapes of the plurality of longest slit regions at the predetermined relative positions with respect to a position of the received locus that matches the shape of the reference slit;

a value slit identifying step of, in a case where a the locus received at the touch panel step is included in any of the displayed plurality of longest slit regions, identifying the position and length of the value slit that is included in that longest slit region, based on a position and length of the received locus; and a card identifying step of, when, for all of the displayed plurality of longest slit regions, the position and length of the value slit included therein are identified, identifying the type of the card based on a combination of the identified positions and lengths of the value slits.

8. A non-transitory computer-readable information recording medium that stores a program for controlling a computer to identify a type of a card having a plurality of slits, one of the plurality of slits being a reference slit having a predetermined asymmetric shape, each of the others of the plurality of slits being a value slit whose position and length are determined such that the slit is included in an unshared one of a plurality of longest slit regions whose relative position with respect to the reference slit is predetermined, and a combination of the positions and lengths of the plurality of value slits being associated with the type of the card, the program controlling the computer to function as:

a touch panel unit, on whose surface the card is placed, that receives an input of a locus produced by a pointer that slides along any slit of the card placed on the surface while moving in contact with the surface to feel the slit;

an image display unit that displays an image by making the image show through the touch panel unit;

a reference slit determining unit that determines whether the locus received by the touch panel unit matches the shape of the reference slit or not;

a slit region display control unit that, in a case where the reference slit determining unit determines that the locus matches the shape of the reference slit, controls the image display unit to display shapes of the longest slit regions at the predetermined relative positions with respect to a position of the received locus that matches the shape of the reference slit;

a value slit identifying unit that, in a case where the locus received by the touch panel unit is included in any of the displayed plurality of longest slit regions, identifies the position and length of the value slit that is included in that longest slit region, based on a position and length of the received locus; and a card identifying unit that, when, for all of the displayed plurality of longest slit regions, the position and length of the value slit included therein are identified, identifies the type of the card based on a combination of the identified positions and lengths of the value slits.

9. A program stored in a non-transitory computer-readable information recording medium, the program for controlling a computer to identify a type of a card having a plurality of slits, one of the plurality of slits being a reference slit having a predetermined asymmetric shape, each of the others of the plurality of slits being a value slit whose position and length are determined such that the slit is included in an unshared one of a plurality of longest slit regions whose relative position with respect to the reference slit is predetermined, and a combination of the positions and lengths of the plurality of value slits being associated with the type of the card, the program controlling the computer to function as:

a touch panel unit, on whose surface the card is placed, that receives an input of a locus produced by a pointer that slides along any slit of the card placed on the surface while moving in contact with the surface to feel the slit;

an image display unit that displays an image by making the image show through the touch panel unit;

a reference slit determining unit that determines whether the locus received by the touch panel unit matches the shape of the reference slit or not;

a slit region display control unit that, in a case where the reference slit determining unit determines that the locus matches the shape of the reference slit, controls the image display unit to display shapes of the longest slit regions at the predetermined relative positions with respect to a position of the received locus that matches the shape of the reference slit;

a value slit identifying unit that, in a case where the locus received by the touch panel unit is included in any of the displayed plurality of longest slit regions, identifies the position and length of the value slit that is included in that longest slit region, based on a position and length of the received locus; and a card identifying unit that, when, for all of the displayed plurality of longest slit regions, the position and length of the value slit included therein are identified, identifies the type of the card based on a combination of the identified positions and lengths of the value slits.

* * * * *

UNITED STATES PATENT AND TRADEMARK OFFICE
CERTIFICATE OF CORRECTION

PATENT NO. : 8,157,170 B2  
APPLICATION NO. : 12/445178  
DATED : April 17, 2012  
INVENTOR(S) : Haruki Nitta Page 1 of 1

It is certified that error appears in the above-identified patent and that said Letters Patent is hereby corrected as shown below:

Column 22, line 4: Delete "(" before the word hereinafter.

Column 22, line 5: Delete ""main value slit"" and replace with -- main value slit --.

Column 22, line 9: Delete ""sub value slit"" and replace with -- sub value slit --.

Signed and Sealed this
Twenty-sixth Day of June, 2012

David J. Kappos
*Director of the United States Patent and Trademark Office*